United States Patent

Padovani

[11] Patent Number: 6,022,208
[45] Date of Patent: Feb. 8, 2000

[54] APPARATUS FOR REMOVING HOLLOW ARTICLES FROM A MOULD

[75] Inventor: Pietro Padovani, Verona, Italy

[73] Assignee: ISAP OMV Group S.p.A., Italy

[21] Appl. No.: 08/914,134

[22] Filed: Aug. 19, 1997

Related U.S. Application Data

[63] Continuation of application No. 08/481,458, Jul. 12, 1995, abandoned.

[30] Foreign Application Priority Data

Jan. 12, 1993 [IT] Italy .................................. VR93A0002

[51] Int. Cl.[7] .................................................. B29C 51/44
[52] U.S. Cl. .................. 425/403.1; 264/334; 425/436 R; 425/436 RM; 425/444
[58] Field of Search ................ 425/126.1, 392, 425/397, 444, 403.1, 437, 436 R, 436 RM; 264/297.5, 297.8, 334

[56] References Cited

U.S. PATENT DOCUMENTS

| | | | |
|---|---|---|---|
| 3,734,666 | 5/1973 | Guest et al. | 425/437 |
| 3,767,342 | 10/1973 | Potter et al. | 425/437 |
| 4,284,400 | 8/1981 | Kaspar et al. | 425/403.1 |
| 4,464,329 | 8/1984 | Whiteside et al. | 425/388 |
| 4,560,339 | 12/1985 | Padovani | 425/437 |
| 4,571,320 | 2/1986 | Walker | 425/403.1 |
| 4,872,826 | 10/1989 | Padovani | 425/403.1 |
| 4,948,006 | 8/1990 | Okabe et al. | 425/403.1 |
| 5,118,277 | 6/1992 | Padovani | 425/397 |
| 5,591,463 | 1/1997 | Padovani | 425/403.1 |
| 5,637,332 | 6/1997 | Ridout | 425/392 |

*Primary Examiner*—Harold Pyon
*Assistant Examiner*—Joseph Leyson
*Attorney, Agent, or Firm*—Zarley, McKee, Thomte, Voorhees & Sease

[57] ABSTRACT

A pick-up and transfer head (1) for hollow objects (10) which is particularly suitable for picking up thermoformed objects from a female die (3) and transferring them to a receiving station (22) in a thermoforming apparatus, which comprises at least one pick-up structure (1) which is designed to engage and support the object (10) or objects to be picked up and transfer them to a supporting and displacement unit (22), and has a flat plate-like (4) or reticular member having at least one seat (5) for the respective object (10) or objects to be picked up and transferred, engaging/disengaging means (6) for the corresponding object (10) located at seat (5) or seats and control means for the said engaging/disengaging means (6) to control the picking-up and release of the object (10) or objects.

2 Claims, 4 Drawing Sheets

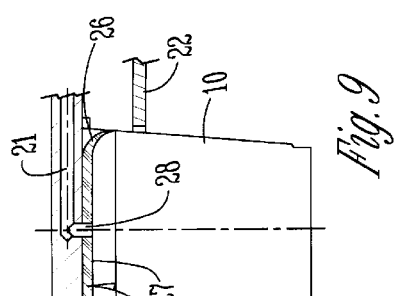
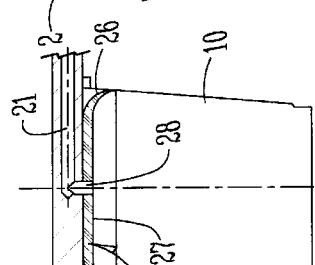
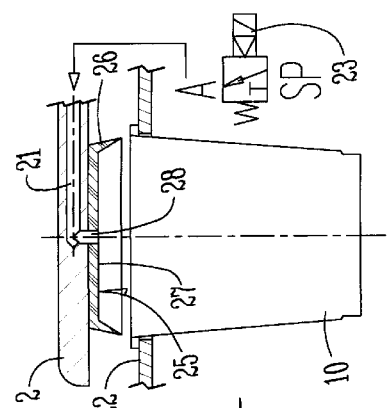
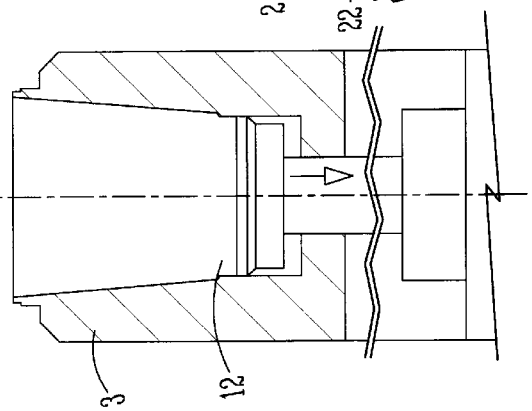
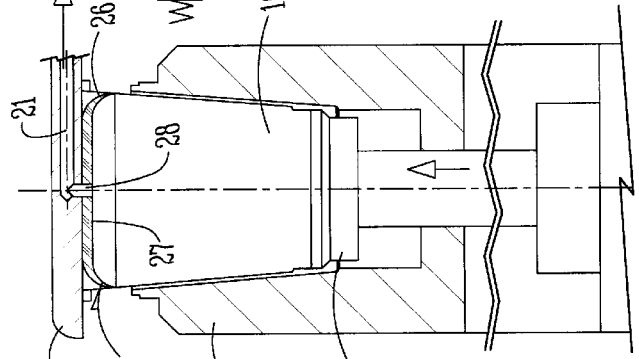
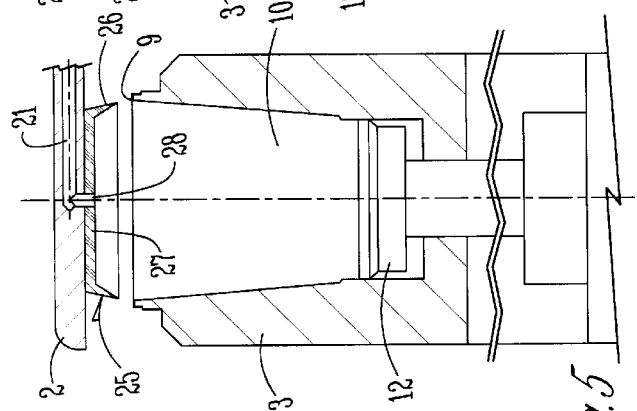
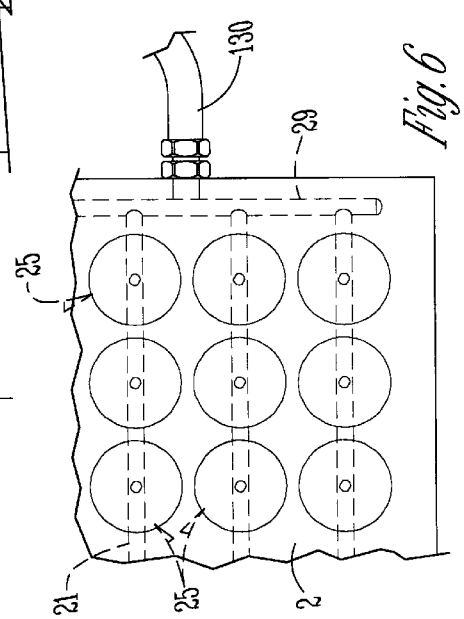

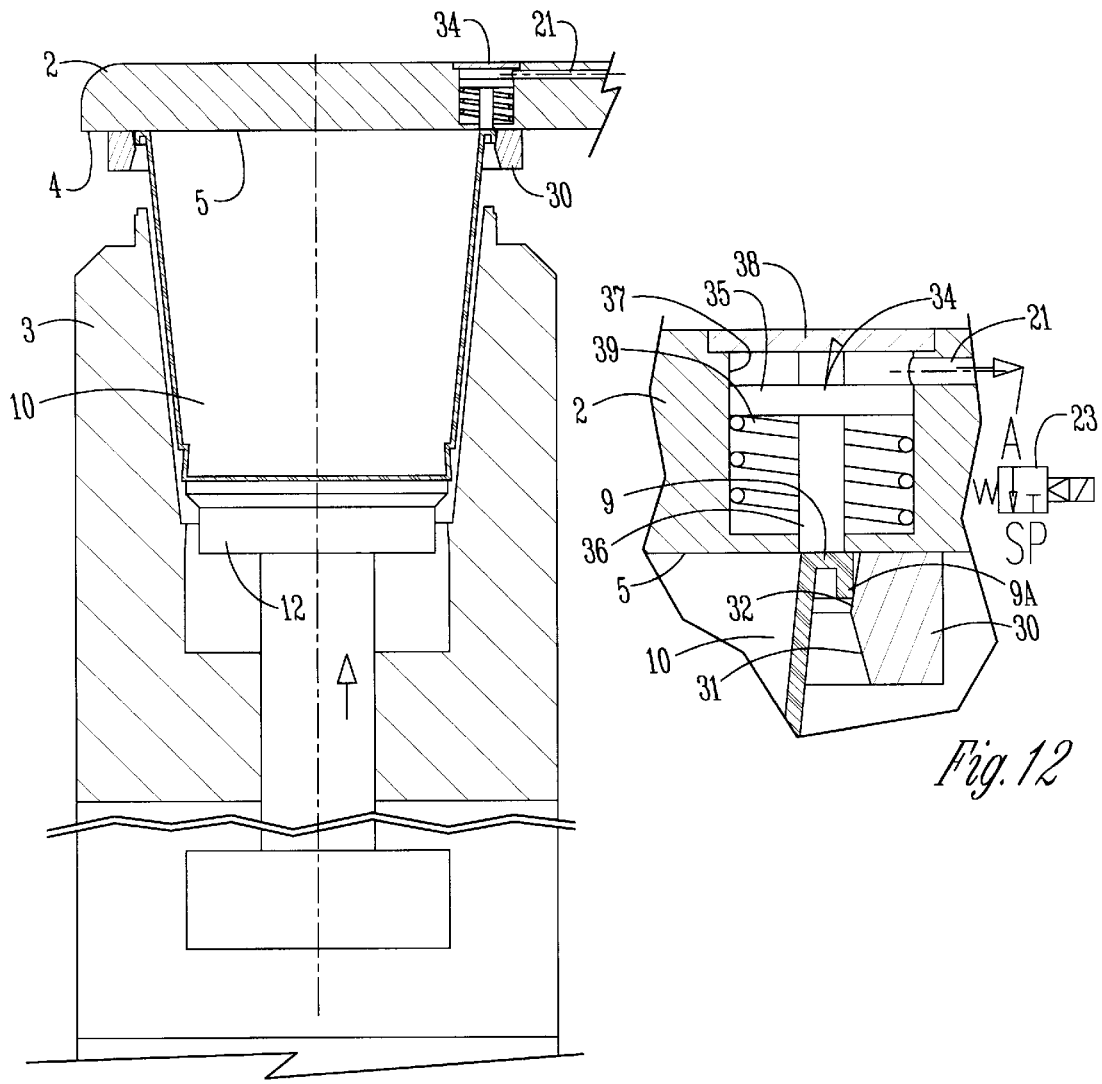
Fig. 11
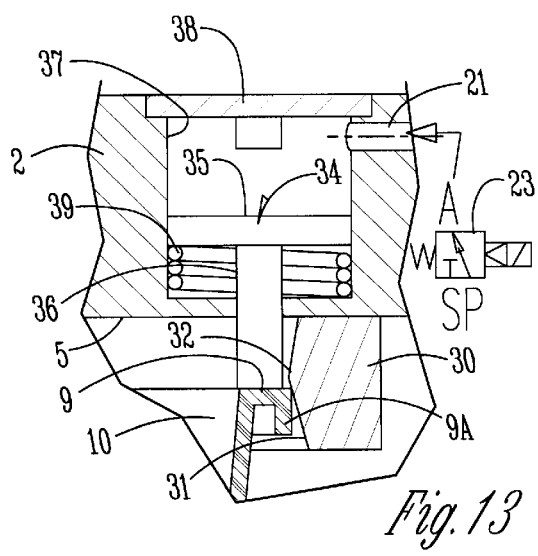
Fig. 12
Fig. 13

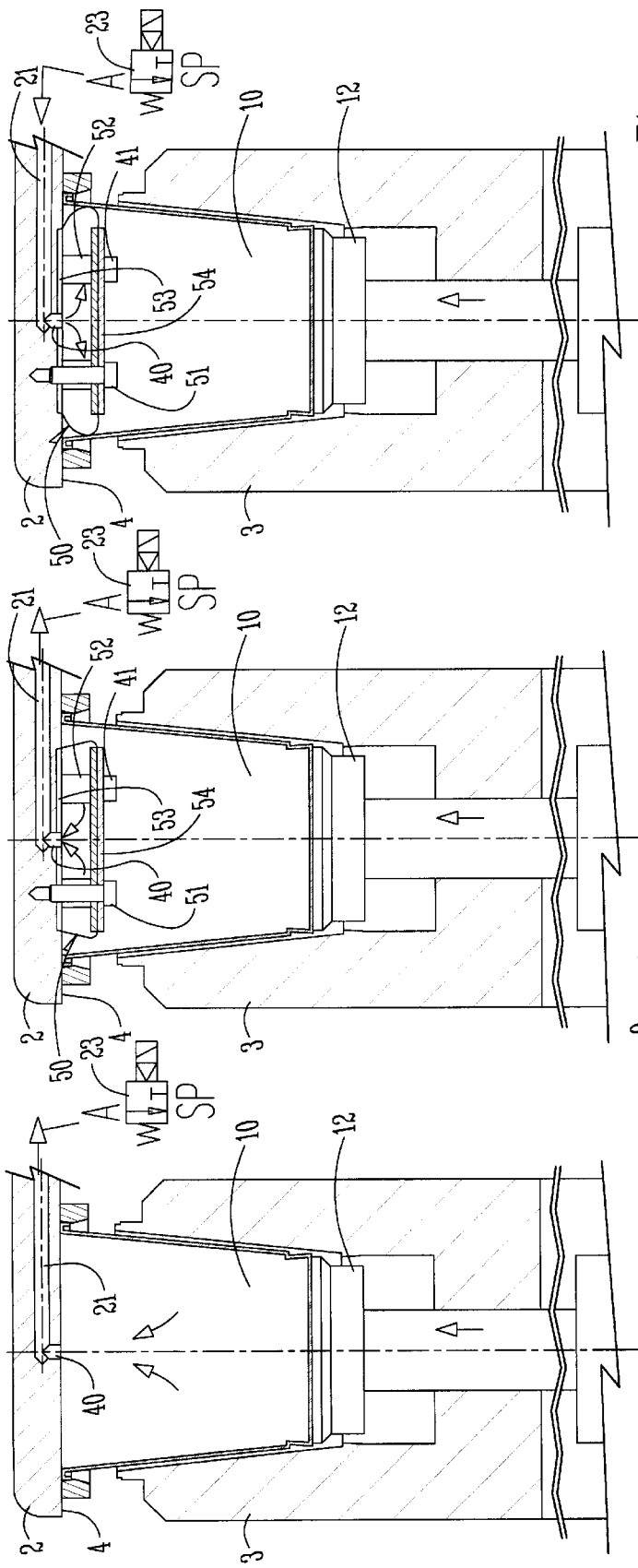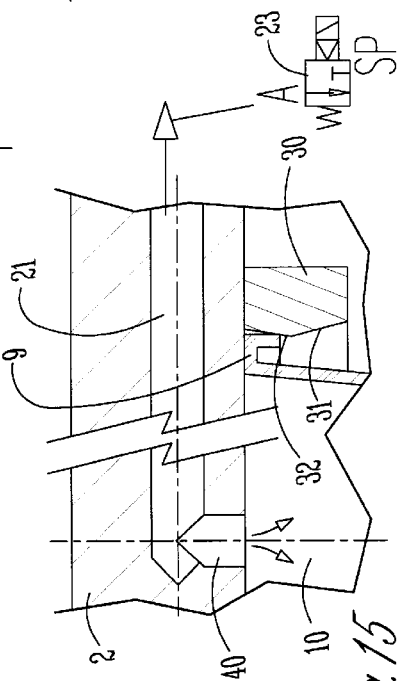

APPARATUS FOR REMOVING HOLLOW ARTICLES FROM A MOULD

This is a continuation of copending application(s) Ser. No. 08/481,458 filed on Jul. 12, 1995, now abandoned, which is a U.S. National Phase of PCT/EP93/03700, filed Dec. 27, 1993—priority claim: Italy Appln. No. VR93A000002, filed Jan. 12, 1993.

BACKGROUND OF THE INVENTION

This invention relates to a pick-up and transfer head for thermoformed hollow objects such as glasses, cups, goblets, trays and the like, especially designed for use with double female die thermoforming equipment.

In the manufacture of objects from thermoplastic materials, e.g. those referred to as "disposable", from a sheet of material suitable for hot pressing, "thermoforming" machines, and more specifically thermoforming machines in which the objects are formed or stamped and separated from the strip of material at a single workstation, in particular thermoforming equipment like that described and illustrated in Italian patent application No. VR92A000012 filed on Feb. 2, 1992, are traditionally used.

The thermoforming cycle of the machines of this type comprises the following fundamental stages: advancement of the sheet with the mould or die open, forming while the mould is closed, cutting, and descent of the lower (female) part of the mould, which carries the thermoformed and cut-out objects with it.

The female (double female) parts of the mould have a moving bottom wall. This bottom wall stops at a predetermined level during its descent while the remainder of the female die continues its downward movement, thus completely removing and releasing the objects from the cavities in the die (removal from the mould).

At this point in the cycle the thermoformed objects have to be moved away from or extracted from the moulding zone in order that they can be transferred to one or more further treatment or processing stations and subsequently stacked.

Various devices for picking up the thermoformed objects have been proposed, including an air blowing system which comprises feeding compressed air to a manifold provided with nozzles which create jets that urge the extracted objects into one or more collection channels, into which they fall and become stacked.

This system can however only be used if the female die has a single row of thermoforming seats. If the objects in the die are arranged in multiple rows the air jets discharge the objects in an uncontrolled way and a suitable stacking device must be provided for subsequent rearrangement and stacking of the objects. This of course results in heavy additional costs, greater structural complexity in the thermoforming plant and its operation, and an appreciable percentage of damaged and therefore reject objects.

Another system which has found wide use is that incorporating a suction plate as described in Italian Patent no. 1 175 178, which is inserted between the male and female parts of the thermoforming mould above the top edge of the thermoformed objects, but below the off-cuts of the sheet of original thermoformable material, in a position such that is can suck up the objects when the female die has completed its downward travel (mould completely open). The suction plate then moves out of the moulding zone, carrying with it the objects, which it transfers to a zone adjacent to the thermoforming machine, where a stacker is provided.

Another pick-up and transfer system for hollow objects is disclosed in FR-A-2 416 856, which provides an inflatable balloon located inside each object to be picked-up and transferred, whereas in DE-A-3 522 983 there is proposed the use of retracting teeth for engaging and supporting objects in a pick-up and transfer arrangement. In DE-C-3 724 178 the bottom face of the base member of pick-up and transfer head 9 is used as the abutting seats for objects 13.

The difficulties and disadvantages which limit the performance of the extraction system in single female die thermoforming machines are:

the distance travelled by the die as the mould opens is very long, as it must be sufficient to provide the space necessary for the suction plate to enter between the waste sheet and the thermoformed objects; should this distance be reduced beyond certain limits, this will create problems with dimensioning of the suction plates, while increasing the height will result in an appreciable diminution in the productivity of the thermoforming machine, because it will mean that the opening stoke will be increased, the longer the time interval during which the mould is open to allow the suction plate to enter and depart from the moulding zone the longer will be the deadtime in the thermoforming cycle, when objects of relatively large dimensions or many rows of small objects are present in the mould, the time for moving the suction plate will increase appreciably, and the residence time for the objects in the mould, whose walls are cooled, must be short so as not to reduce the speed of the thermoforming machine and so as not to remove excessive heat from the objects while they are stabilising.

One of the greatest disadvantages of thermoforming machines which use suction plate extraction is therefore the shape and dimensions of the suction plate itself.

It has already been proposed that thermoformed objects should be picked up and removed by means of one or more suction cup heads with a flat base plate, which act on the objects in the female die after this has been moved away from the moulding zone, and are therefore free from any encumbrance caused by the (fixed) male die which acts together with the double female die. Although this arrangement has proved to be satisfactory for most thermoformed objects, it cannot be used in the case of objects which do not have a flat upper edge, or objects of relatively large dimensions.

An object of this invention is to provide a pick-up and transfer head for thermoformed objects which overcomes or substantially reduces the abovementioned disadvantages incurred with conventional pick-up heads.

Another object of this invention is to provide a pick-up head for virtually universal application, i.e. one which is suitable for use with any type of thermoformed objects.

Another object of this invention is that the said pick-up head is simple in construction and reliable in operation and can be manufactured at a competitive cost.

This and other objects which will become more apparent below are accomplished by a pick-up and transfer head for hollow objects according to this invention.

SUMMARY OF THE INVENTION

The present invention is particularly suitable for picking-up thermoformed objects from a female die and transferring them to a receiving station in thermoforming apparatus and comprises at least one pick-up structure designed to engage and support the object or objects to be picked up and transferred, and a support and displacing unit, and which is characterised in that the or each pick-up structure comprises a flat plate-like or reticular base member having at least one abutting seat for the thermoformed object or objects to be picked up and transferred, means for engaging/disengaging the or each object located in association with the or each seat, and control means for the said engagement/ disengagement means designed to control the picking-up and release of the or each object.

Further aspects and advantages of the pick-up and transfer head according to this invention will be more apparent from the following detailed description of some currently preferred embodiments which are described by way of a non-restrictive example with reference to the accompanying drawings.

BRIEF DESCRIPTION OF THE DRAWINGS

FIG. 5 is a diagrammatical and cross-sectional view of another embodiment of the pick-up and transfer head in the process of approaching a thermoformed object seated in the female die;

FIG. 6 illustrates a view from beneath of a portion of the pick-up head in FIG. 5;

FIG. 7 is a view similar to that in FIG. 5, but while an object is in the process of being removed from the die;

FIG. 8 illustrates the object in FIG. 7 after removal from the die and ready to begin transfer;

FIGS. 9 and 10 are views in elevation and cross-section which illustrate the object in FIG. 8 when it is deposited on a receiving former on a stepwise conveyor;

FIG. 11 shows another embodiment of a pick-up and transfer head according to the invention on a magnified scale in the course of the removal of an object from the thermoforming die;

FIGS. 12 and 13 show a detail of FIG. 11 on a magnified scale in two different operating positions;

FIG. 14 illustrates another embodiment of the pick-up and transfer head in the course of the removal of a thermoformed object;

FIG. 15 shows a detail of FIG. 14 on a magnified scale in a position ready for release of the object, and FIGS. 16 and 17 illustrate a further embodiment of the pick-up and transfer head in elevation and cross-sectional views.

DESCRIPTION OF THE PREFERRED EMBODIMENTS

Figure 1:
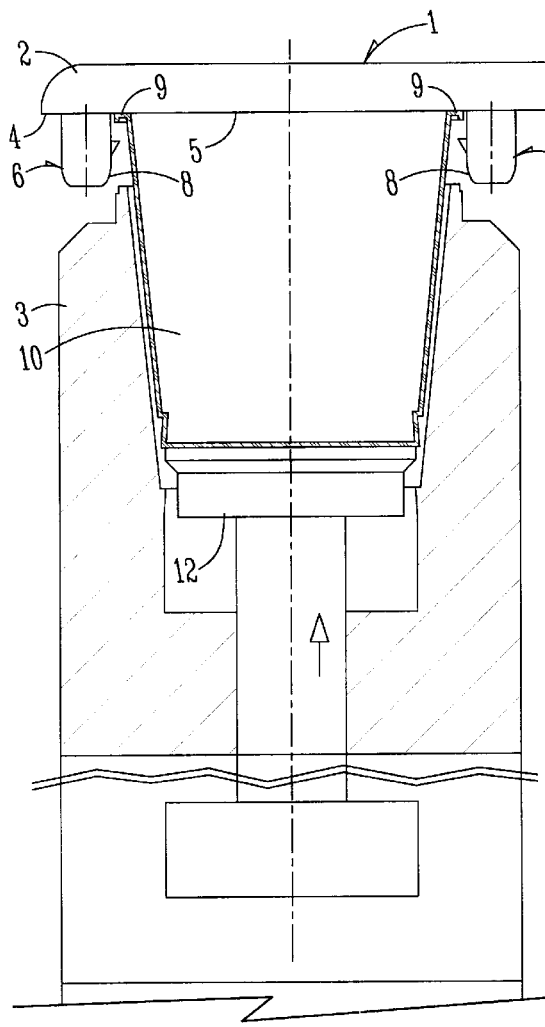
FIG. 1 is a diagrammatical view in frontal elevation and in cross-section of a portion of the female die or mould and a portion of the pick-up head in the process of engaging a thermoformed object.
Figure 2:
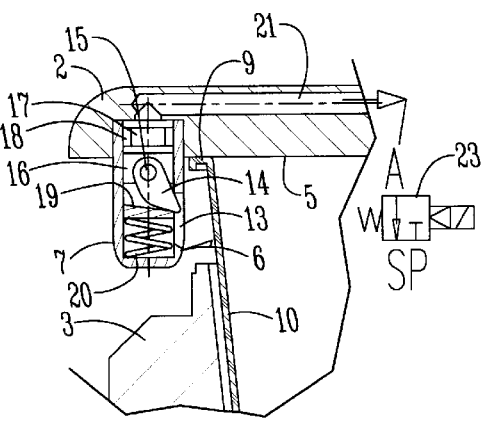
FIG. 2 shows a detail of FIG. 1 on a magnified scale.
Figure 3:
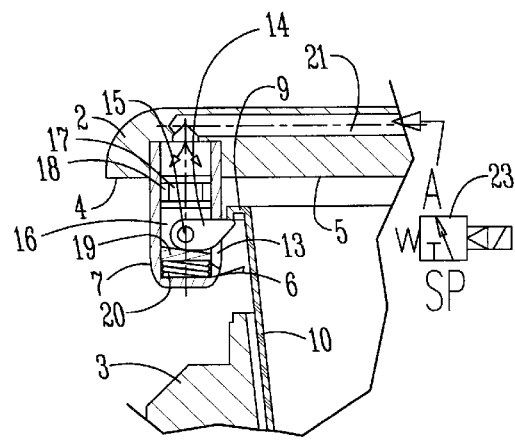
FIG. 3 is a view similar to th at in FIG. 2, but which illustrates a further stage in the engagement of the edge of the object by the head.

In the appended drawings identical or similar parts or components are identified using the same reference numbers.

With reference first to FIGS. 1 to 4, it will be noted that a pick-up and transfer head according to this invention comprises a pick-up structure 1 comprising from a moving plate (2) (or a rigid reticular member) which is carried on e.g. a supporting arm (not shown in the drawing) provided with suitable means of operation for movement from a pick-up position above a female die or mould 3 to a release position at a collection station. Moving plate 2 has a flat lower face 4 upon which are provided one or more seats 5 each bounded by at least two engaging/disengaging units 6 which project from face 4 of the plate.

Each engaging/disengaging unit 6 comprises a projection or sleeve 7, which is closed at the base, one end of which is fixed, e.g. screwed, to face 4 of the plate, while the other end 8 is free and is advantageously of an oval shape or bevelled to form means to easily engage the flanged edge 9 having a flat lower shoulder of a thermoformed object 10, such as a glass, obtained by thermoforming within mould 3, which is equipped with a kick-off bottom or bases or movable extractors 12.

At its wall facing corresponding abutting seat 5, each engaging/disengaging unit 6 has a longitudinal slot 13 which extends over a terminal portion of the length of sleeve 7 through which the free end of a tooth 14 arranged to engage shoulder 9 may project. Tooth 14 is hinged at the top at 15 about a diametral axis of rotation which is normal both to the longitudinal axis of the sleeve and the axial plane of slot 13. Pin 15 is in turn supported by a tailpiece 16 of a piston 17 which is slidably and airtight mounted within sleeve 7 owing the presence of a seal such as an O-ring 18. Below tooth 14 is provided a small plate 19 which can slide within sleeve 7 and has its upper face, that intended to contact tooth 14, shaped as a plane inclined towards slot 13 and its lower face in contact with a return spring 20 which reacts against the closed end of the sleeve.

At the top each sleeve 7 communicates via a respective conduit 21, e.g. provided within the thickness of plate 2 (in which case plate 2 can also act as a manifold) or consisting of a flexible conduit, with a source of pressurised fluid (air) (not shown) incorporating a three-way control electrical valve 23.

Thus, when valve 23 passes pressurised air towards engaging/disengaging units 6 (FIG. 3) their pistons 17 are pressed downwards within respective sleeves 7 against the action of-return springs 20, thus causing the lower tapered points of teeth 14 to project and engage the horizontal engaging and supporting part of the edge of object 10. Object 10 is thus secured to pick-up plate 2, as a result of which it can be removed from die 3 and transferred, in complete safety and without subjecting it to distortion, crushing or deformations of other kinds, to a receiving station, such as e.g. a housing former (indicated by 22 in FIGS. 9 and 10) located on a conveyor belt. At the receiving station control valve 23 vents or discharges the pressurised air which was previously supplied to it via conduit 21 (FIG. 2), as a result of which return spring 20 causes small plate 19 to rise again and this in turn causes tooth 14 to return within sleeve 7 as a result of the shape-controlled sliding connection between the small plate and the tooth, and at the same time displaces piston 17 upwards. Object 10 is therefore released from pick-up head 2 and can fall into the receiving station.

Figure 4:
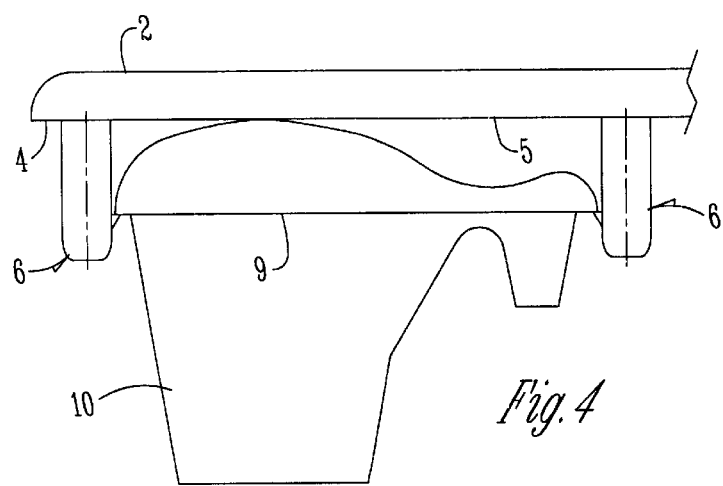
FIG. 4 is a diagrammatical lateral view which illustrates an object which does not have a flat top edge when it is engaged by the head illustrated in FIGS. 1 to 3.

It is important to note that with the pick-up and transfer head described above it is not necessary that thermoformed object 10 should have a circular shape such as a glass, or the shape of a regular polygon, such as a tray, but may have any desired configuration, e.g. a flattened and elongated shape as illustrated in FIG. 4, as long as it is provided with a shoulder 9, which may be continuous or discontinuous, and even continuous with a shoulder not lying in a single plane (in the latter situation engaging/disengaging units 6 may be arranged so as to act at different levels with respect to each other). In addition to this, object 10 may also be of considerable width, in which case it will be sufficient to provide an adequate number of engaging/disengaging units 6 for each seat 5.

The operation of a pick-up and transfer head as described above is very simple and quick. When the thermoforming mould opens, plate 2 moves above female die 3, descends onto object or objects 10 in the manner illustrated in FIG. 2, and abuts against the object or objects. Then electrical valve 23 passes compressed air into engaging/disengaging units 6, which then take the configuration illustrated in FIG. 3, that is they bring their teeth 14 to engage the shoulder of the object or objects, which thus become secured to the plate. Once transfer to the receiving station has been performed, electrical valve 23 causes the compressed air to be discharged, with the consequent withdrawal and disappearance of retaining teeth 14 into respective sleeves 7, as a result of which the objects are released and are free to fall into the receiving station.

In the embodiment illustrated in FIGS. 5 to 10 the engaging/disengaging means attached to pick-up plate 2 comprise a cup 25 positioned in association with each seat 5 which has a peripheral conical or tapering edge 26 of an elastically deformable material. Edge 26 is designed to enter a hollow thermoformed object 10, while undergoing deformation, even if the object is not provided with a flanged edge, and to elastically engage the interior (FIG. 7) in a sufficiently firm way to enable the object to be removed from mould 3 (FIG. 8) and transferred to a receiving former 22 (FIG. 9).

Base 27 of cup 25 has at least one hole 28 which is in communication with a conduit 21 which is in turn in communication with a source of pressurised fluid (air) (not shown) via a three-way electrical control valve 23, which forms a vent to atmosphere for the internal space within object 10 while cup 25 is entering object 10, and sends a pulse (blast) of compressed air into the object (FIG. 10) when this is located in receiving former 22, thus disengaging edge 26 and releasing it.

If a plurality of seats 5 are provided on pick-up plate 2, individual conduits 21 may be connected to a manifold 29 (FIG. 6) which is in turn supplied with compressed air via a conduit 130 from the compressed air source via a valve 23.

Of course, an elastic ring formed of edge 26 alone firmly attached to the flat face 4 of head 2 may be provided instead of cup 25.

FIGS. 11 to 13 illustrate a further embodiment of pick-up head 2, in which a ring or at least two opposing annular lengths 30 arranged concentrically around the or a respective seat 5 are provided at each seat 5. This embodiment is particularly advantageous when dealing with objects 10 which may have edges, but which for some reason do not abut perfectly against the flat face 4 of plate 2.

Ring or annular lengths 30 have their internal walls formed by a countersunk length 31 which widens towards the object which is to be engaged and a countersunk length 32 which widens towards plate 2. With this configuration, when plate 2 is lowered onto objects 10 in mould 3 the external curls or lips 9a of edges 9 are first caused to slide along countersunk length 31 to be caused to bend back slightly upon themselves and to be resiliently deformed— while nevertheless undergoing a deformation which is well within the limit of elasticity of the material of which they are constructed—and then along length 32 where they can expand a little and abut against plate 2 being thus secured within the ring or between annular sections 30.

Along edge line 9 are provided one or more kick-off devices 34, each of which is formed of a piston 35 provided with a piston rod 36 movably mounted within a hole 37 provided e.g. in plate 2. Hole 37 provides a passage for piston rod 36 in the flat face 4 of plate 2, while at its other end it may be sealed by a plate 38. Piston 35 is spring-loaded by a return spring 39 on its side facing flat face 4, while on its other side it is in communication via a conduit 21 with a source of compressed air via a three-way electrical control valve 23 (FIG. 12).

Thus, to release object 10 from plate 2 all that is required is to pass compressed air through conduit 21, and this, acting against spring 39, lowers piston 35 and its piston rod 36 then presses edge 9 outside the ring or annular sections 30 (FIG. 13).

In the variant illustrated in FIGS. 14 and 15, one or more holes 40 in communication with a source of compressed air (not shown) via conduit 21 and electrical control valve 23 are provided instead of kick-off devices 34. An object 10 is held against plate 2 through the elastic grip of its edge 9, as in the example illustrated in FIGS. 11 to 13, but edge 9 is sealed by ring 30. In order to expel object 10 valve 23 places conduit 21 in communication with the source of pressurised air for an instant, and this discharges a pulse of air into the object causing it to be removed.

FIGS. 16 and 17 illustrate an embodiment in which the engagement/disengagement means comprise an expandable and compressible air bag 50 which can be inserted into object 10 in a limp condition and then caused to expand by inflation until it engages the inner walls of the said object. To this purpose the expandable air bag may comprise an elastic membrane held in position against the surface of seat 5, for example by means of screws 51 and spacers 52 placed between a fixing plate 53 to plate 2 and a small retaining plate 54, so that the bag can expand and press its side wall against the inner walls of an object 10.

The interior of the membrane may be placed in communication with a source of compressed air via hole 40, conduit 21 and three-way electrical control valve 23 for inflation during the picking up stage and communication with the atmosphere in order to discharge the air and therefore releasing object 10 at the receiving station after extraction and transfer from mould 3.

The pick-up and transfer head described above is susceptible of many modifications and variations within the scope of this invention as defined by the claims below.

Thus for example plate 2 could also be replaced with a reticular structure with cells connected to a respective flexible conduit 21.

Moreover, elastically yielding member 50 may be caused to expand and contract by mechanical instead of pneumatic means, e.g. by expansion segments controlled by a tapering component controlled by a rod mechanism.

I claim:

1. An apparatus for picking up a cup-shaped impermeable hollow thermoformed object from a female die and transferring said object to a receiving station in a thermoforming machine, the apparatus comprising:

a pick-up plate member (2) having a face (4) thereof which is directed toward an upper shoulder (9) on the object (10) to be picked up from the female die (3);

engaging means (6) for releasably engaging the object (10) being mounted on said face (4) of the pick-up plate member (2) and delimiting a receiving seat (5) for locating the object to be picked up and transferred;

fluid pulse releasing means (P, 21, 23) for disengaging the object (10) from the engaging means (6) the fluid pulse releasing means (P, 21, 23) including control means (23) for controlling delivery of a fluid pulse from said fluid pulse releasing means (P, 21, 23) to disengage and thereby release the object (10) from the engaging means (6);

said engaging means (6) comprising at least two straight tubular members (7) projecting from said face (4) of said plate member (2) and acting as guides for the object (10) to be engaged;

said tubular members (7) being each formed with a longitudinal slot (13) extending over a portion thereof facing the receiving seat (5), a slide (17) operatively connected to said fluid pulse releasing means (P, 21, 23) and movably arranged in each respective tubular member (7), said slide (17) being movable in response to a fluid pulse from said fluid pulse releasing means (P, 21, 23) and thereby controlled by said control means (23);

a retractable tooth (14) pivotably mounted on said slide (17), the tooth (14) being spring-biased by a resilient return means (20) to slidably engage an inclined plane member moveably disposed in the tubular member (7) so that the tooth (14) projects through the longitudinal slot 13 and engages the upper shoulder (9) of the object (10) when the control means is positioned to allow the fluid pulse releasing means (P, 21, 23) to deliver a fluid pulse to the slide (17) and thereby generate a force on the slide (17) sufficient to overcome the spring-bias force of the resilient return means (20); and whereby the resilient return means (20) urges the tooth (14) to move along the inclined plane member (19) so as to retract in order to release the object (10) when the control means (23) is positioned to prevent the fluid pulse releasing means (P, 21, 23) from delivering a fluid pulse to the slide (17).

2. An apparatus for picking up a cup-shaped impermeable hollow thermoformed object from a female die and transferring said object to a receiving station in a thermoforming machine, the apparatus comprising:

a pick-up plate member (2) having a face thereof which is directed toward an upper shoulder (9) on the object (10) to be picked up from the female die (3);

engaging means (25) for releasably engaging the object (10) being mounted on said face and delimiting a receiving seat for locating the object (10) to be picked up and transferred;

said engaging means (25) comprising at least one annular, elastic member secured to said face and arranged to partly enter said hollow object (10) to uniformly elastically engage an interior peripheral upper zone thereof in sufficiently firm way to enable the object to be removed from the female die;

fluid pulse releasing means (P, 21, 28, 23) including control means (23) for controlling the delivery of a fluid pulse through at least one connecting duct (21, 28) from a source of pressurized fluid (P) via said control means (23) to the interior of said hollow object (10);

whereby said hollow object is released when a fluid pulse of sufficient force is delivered to the interior of the hollow object so as to break the elastic engagement between the annular member and interior peripheral upper zone of the object (10).

* * * * *